(12) United States Patent
Min et al.

(10) Patent No.: US 9,104,228 B2
(45) Date of Patent: Aug. 11, 2015

(54) ACTIVE CONTROL METHOD OF ACCELERATOR PEDAL EFFORT

(71) Applicants: Hyundai Motor Company, Seoul (KR); Kia Motors Corporation, Seoul (KR)

(72) Inventors: Jeong Seon Min, Gwangju (KR); Yang Rae Cho, Gyeonggi-do (KR); Jee Hyuck Choi, Gyeonggi-do (KR); Eun Sik Kim, Gyeonggi-do (KR); Ho Seung Jang, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 13/949,599

(22) Filed: Jul. 24, 2013

(65) Prior Publication Data

US 2014/0311278 A1 Oct. 23, 2014

(30) Foreign Application Priority Data

Apr. 23, 2013 (KR) ......................... 10-2013-0044849

(51) Int. Cl.
| | | |
|---|---|---|
| B60W 50/16 | (2012.01) | |
| G05G 1/40 | (2008.04) | |
| B60K 26/02 | (2006.01) | |
| G05G 1/44 | (2008.04) | |
| G05G 5/03 | (2008.04) | |
| B60W 30/18 | (2012.01) | |

(52) U.S. Cl.
CPC ........ *G05G 1/40* (2013.01); *B60K 26/02* (2013.01); *B60W 30/18145* (2013.01); *B60W 30/18163* (2013.01); *B60W 50/16* (2013.01); *G05G 1/44* (2013.01); *G05G 5/03* (2013.01); *Y02T 10/6204* (2013.01); *Y10T 74/20534* (2015.01)

(58) Field of Classification Search
CPC ........... G05G 1/30; G05G 1/40; G05G 1/405; G05G 1/44; G05G 1/445; G05G 5/03; B60W 50/16; B60W 50/08; B60W 50/12; B60K 26/02; B60K 26/021; B60K 2026/022
See application file for complete search history.

(56) References Cited

U.S. PATENT DOCUMENTS

| | | | | |
|---|---|---|---|---|
| 2005/0187713 | A1* | 8/2005 | Yamamura et al. | 701/301 |
| 2005/0273215 | A1* | 12/2005 | Kuge | 701/1 |
| 2007/0142987 | A1* | 6/2007 | Takamatsu et al. | 701/41 |
| 2014/0123802 | A1* | 5/2014 | Kim et al. | 74/513 |
| 2014/0142806 | A1* | 5/2014 | Min et al. | 701/36 |
| 2014/0142807 | A1* | 5/2014 | Min et al. | 701/36 |
| 2014/0309858 | A1* | 10/2014 | Min et al. | 701/36 |
| 2014/0316647 | A1* | 10/2014 | Min et al. | 701/36 |
| 2014/0331813 | A1* | 11/2014 | Min et al. | 74/513 |

FOREIGN PATENT DOCUMENTS

| | | |
|---|---|---|
| JP | 11-334622 A | 12/1999 |
| JP | 2004-017930 A | 1/2004 |
| JP | 2005-180196 A | 7/2005 |

(Continued)

*Primary Examiner* — Edwin A Young
(74) *Attorney, Agent, or Firm* — Mintz Levin Cohn Ferris Glovsky and Popeo, P.C.; Peter F. Corless (57) ABSTRACT

An active control method of accelerator pedal effort is configured such that, when a driver changes lanes while driving a vehicle having a pedal effort controllable accelerator, the method can actively control the accelerator pedal effort so as to reduce the pedal effort, and when the driver turns corners while driving the vehicle, the method can actively control the accelerator pedal effort so as to increase the pedal effort.

10 Claims, 7 Drawing Sheets

(56) References Cited

FOREIGN PATENT DOCUMENTS

| JP | 2005-182123 A | 7/2005 |
| KR | 10-2003-0046973 A | 6/2003 |
| KR | 10-2006-0104148 A | 10/2006 |
| KR | 10-2010-0063453 | 6/2010 |

* cited by examiner

FIG. 6 steering wheel rotation angle (S) =
0(neutral state) < ±X < ±Y < ±Z(maximum rotated state),
wherein + angles are clockwise rotation angles from neutral state and
− angles are counterclockwise rotation angles from neutral state.

FIG. 7

ACTIVE CONTROL METHOD OF ACCELERATOR PEDAL EFFORT

CROSS REFERENCE TO RELATED APPLICATION

This application claims under 35 U.S.C. §119(a) the benefit of Korean Patent Application No. 10-2013-0044849, filed on Apr. 23, 2013, the entire contents of which are incorporated herein by reference.

BACKGROUND (a) Technical Field

The present invention relates, in general, to an active control method of accelerator pedal effort and, more particularly, to an active control method of accelerator pedal effort which is configured such that, when a driver changes lanes while driving a vehicle, the method can actively control the accelerator pedal effort so as to reduce the pedal effort, and when the driver turns corners while driving the vehicle, the method can actively control the accelerator pedal effort so as to increase the pedal effort.

(b) Description of the Related Art

Figure 1:
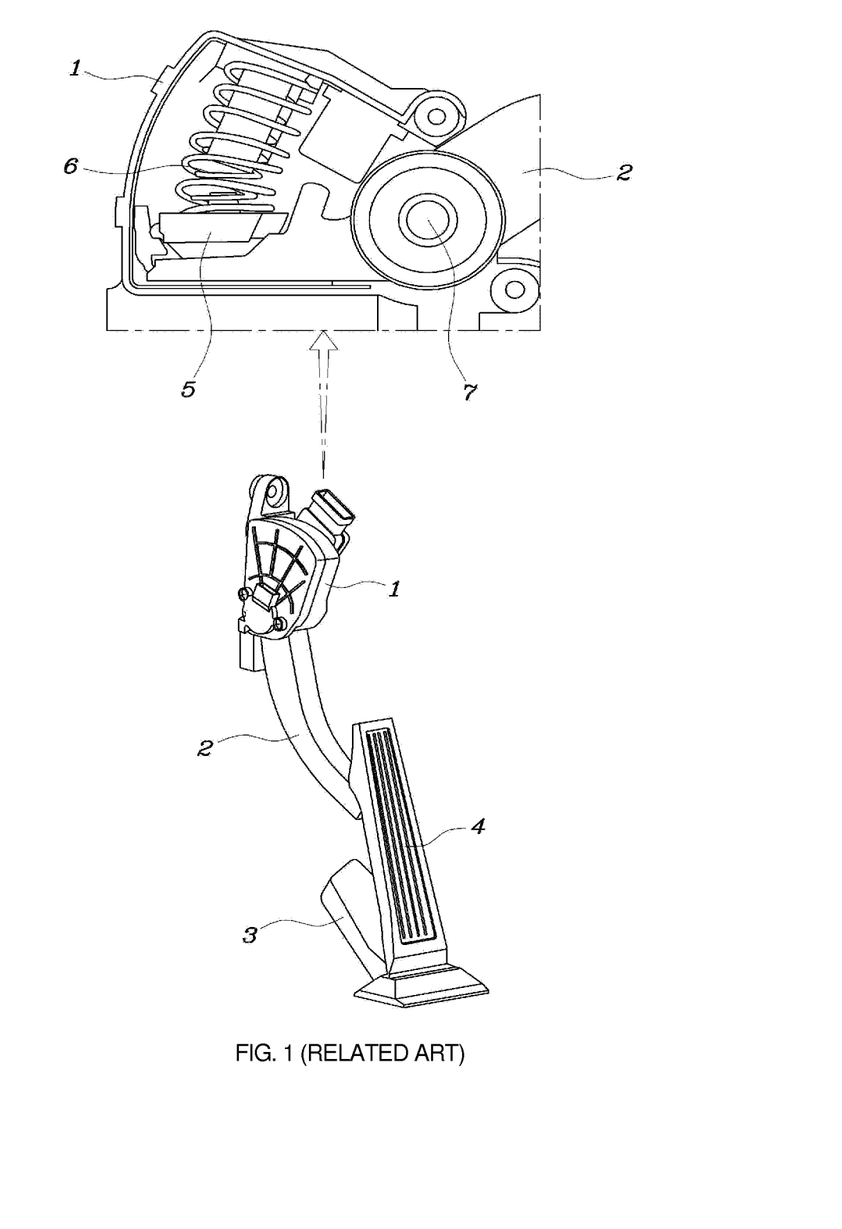
FIG. 1 (RELATED ART) is a view illustrating a related art accelerator pedal without a pedal effort control function.
Figure 2:
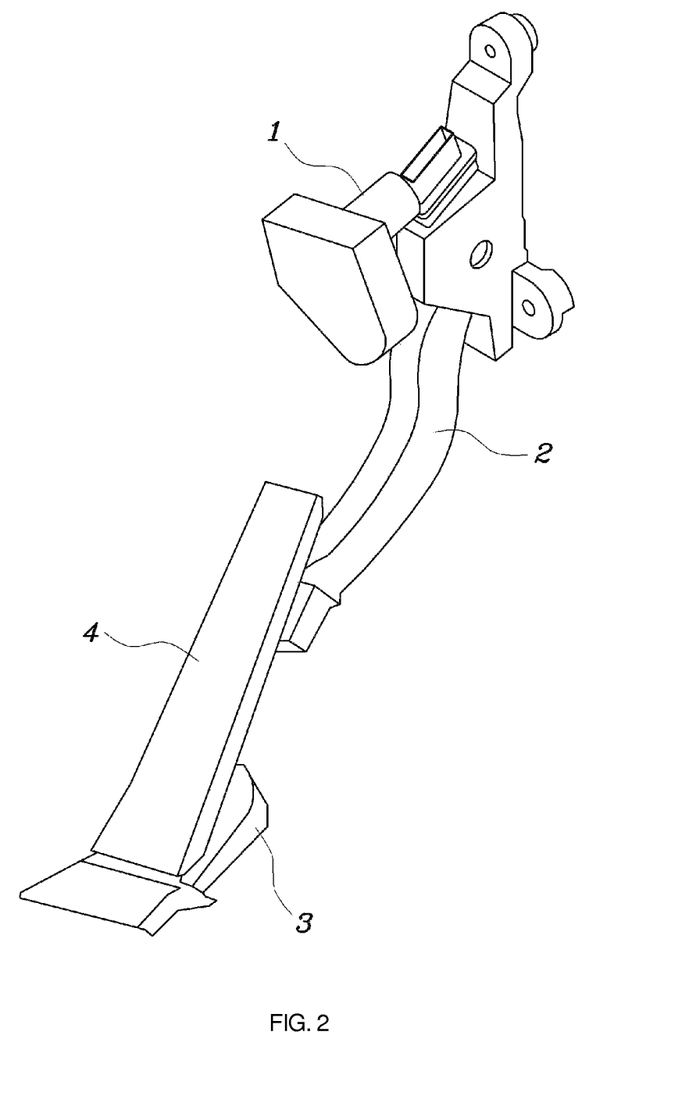
FIGS. 2 through 5 are views illustrating an accelerator pedal having a pedal effort control function according to the present invention.

FIG. 1 (RELATED ART) illustrates an organ type of accelerator pedal, as an example of related art vehicle accelerator pedals. The related art accelerator pedal includes: a pedal arm housing 1 that is securely mounted to a frame panel placed below a driver's seat; a pedal arm 2, one end of which is rotatably connected to the pedal arm housing 1; a pedal bracket 3 that is securely mounted to a floor panel placed below the driver's seat; and a pedal pad 4, one end of which is rotatably connected to the pedal bracket 3 and which is coupled to the pedal arm 2 by a ball joint coupling method.

In particular, a spring plate 5 is combined with an end of the pedal arm 2 that is placed in the pedal arm housing 1. A spring 6 is installed in the pedal arm housing 1 in such a way that a first end of the spring 6 is held by the spring plate 5 and a second end of the spring 6 is held by the pedal arm housing 1.

Accordingly, during an operation of the related art accelerator pedal having the above-mentioned construction, when the pedal arm 2 is rotated around a hinge shaft 7 relative to the pedal arm housing 1, the spring 6 is elastically compressed and forms pedal effort of the pedal pad 4.

However, the above-mentioned related art accelerator pedal is configured such that it should use a spring having a predetermined elastic modulus as the spring 6 so as to meet applicable safety laws and regulations, and so it is impossible to change the pedal effort of the related art accelerator pedal unless the spring 6 is replaced. Further, in the related art accelerator pedal, it is impossible to actively vary the accelerator pedal effort when a driver changes lanes or turns corners while driving a vehicle, and so the related art accelerator pedal cannot provide desired driving safety to the driver.

The foregoing is intended merely to aid in the understanding of the background of the present invention, and is not intended to mean that the present invention falls within the purview of the related art that is already known to those skilled in the art.

SUMMARY

The present invention provides an active control method of accelerator pedal effort, which is configured such that when a driver changes lanes while driving a vehicle in which the accelerator pedal effort is controllable, the active control method can actively control the accelerator pedal effort so as to reduce the pedal effort, thereby allowing the driver to change lanes quickly, and when the driver turns corners while driving the vehicle, the active control method can actively control the accelerator pedal effort so as to increase the pedal effort, thereby providing improved driving safety to the driver when turning corners.

In order to achieve the above object, according to one aspect of the present invention, there is provided an active control method of accelerator pedal effort, including: a vehicle speed determination step of determining whether or not a vehicle speed is higher than a preset reference speed, which corresponds to a reference speed of low-speed driving, when a vehicle having a pedal effort controllable accelerator is started; a pedal effort reducing step of determining whether or not a driver of the vehicle is changing lanes when it is determined at the vehicle speed determination step that the vehicle speed is higher than the preset reference speed, and controlling a present accelerator pedal effort so as to reduce the pedal effort to a preset target pedal effort when it is determined that the driver is changing lanes; and a pedal effort increasing step of determining whether or not the driver is turning a corner when it is determined that the driver is not changing lanes, and controlling the present accelerator pedal effort so as to increase the pedal effort to the preset target pedal effort when it is determined that the driver is turning a corner.

In particular, when it is determined at the vehicle speed determination step that the vehicle speed is not higher than the preset reference speed, it may be determined that the driver is driving the vehicle straight at a low speed or is stopping the vehicle, and when the driver is driving the vehicle straight at the low speed or is stopping the vehicle, the present accelerator pedal effort may be controlled to be maintained at a previous pedal effort, which corresponds to the most recent previous pedal effort.

Further, when a first condition that a steering wheel rotation angle (S) is larger than an angle −(negative)X and is less than an angle X based on a neutral state, that is, −X<S<X, is satisfied, it may be determined that the driver is driving the vehicle straight at the low speed or is stopping the vehicle, wherein a difference in a size of the steering wheel rotation angle (S) is defined by a relation, 0(neutral state)<±X<±Y<±Z(maximum rotated state), wherein +(positive) angles are clockwise rotation angles from the neutral state and −angles are counterclockwise rotation angles from the neutral state.

Further, when both a second condition that a steering wheel rotation angle (S) is −X<S<−Y or X<S<Y and a third condition that a turn signal lamp signal has been generated are satisfied, or when only the second condition is satisfied, it may be determined that the driver is changing lanes while driving the vehicle, wherein a difference in a size of the steering wheel rotation angle (S) is defined by a relation, 0(neutral state)<±X<±Y<±Z(maximum rotated state), wherein +angles are clockwise rotation angles from the neutral state and −angles are counterclockwise rotation angles from the neutral state.

Further, when both a fourth condition that a steering wheel rotation angle (S) is −Y<S<−Z or Y<S<Z and a fifth condition that a turn signal lamp signal has been generated are satisfied, or when only the fourth condition is satisfied, it may be determined that the driver is turning a corner while driving the vehicle, wherein a difference in a size of the steering wheel rotation angle (S) is defined by a relation, 0(neutral state)<±X<±Y<±Z(maximum rotated state), wherein +angles are clockwise rotation angles from the neutral state and −angles are counterclockwise rotation angles from the neutral state.

The active control method of accelerator pedal effort may further include: a gear stage determination step of determining whether a present gear stage is a drive (D) gear stage or not when the vehicle is started, prior to the vehicle speed determination step.

In particular, only when it is determined at the gear stage determination step that the present gear stage is the drive (D) gear stage, the vehicle speed determination step may be performed, and when it is determined that the present gear stage is not the drive (D) gear stage, the present accelerator pedal effort may be controlled to be maintained at a previous pedal effort (the most recent previous pedal effort).

The active control method of accelerator pedal effort may further include: a pedal effort control system checking step of determining whether a pedal effort control system is in a normal state when the vehicle is started, prior to the gear stage determination step.

In particular, only when it is determined at the pedal effort control system checking step that the pedal effort control system is in the normal state, the gear stage determination step may be performed, and when it is determined that the pedal effort control system is in an abnormal state, the present accelerator pedal effort may be reset to an initial pedal effort.

Further, only when a battery voltage signal represents a normal state of a battery, and no signal that requires an initialization of the present accelerator pedal effort against an abnormal state is output, and a signal that represents a pedal effort active control mode is generated, it may be determined at the pedal effort control system checking step that the pedal effort control system is in the normal state.

As described above, the active control method of accelerator pedal effort according to the present invention is advantageous in that, when a driver changes lanes while driving a vehicle in which the accelerator pedal effort is controllable, the active control method can actively control the accelerator pedal effort so as to reduce the pedal effort, and, when the driver turns corners while driving the vehicle, the active control method can actively control the accelerator pedal effort so as to increase the pedal effort, thereby providing improved driving safety to the driver when driving the vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a preferred embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As shown in FIGS. 2 through 5, a vehicle accelerator pedal having a pedal effort control function according to the present invention includes: a pedal arm housing 1 that is securely mounted to a frame panel placed below a driver's seat; a pedal arm 2, one end of which is rotatably connected to the pedal arm housing 1; a pedal bracket 3 that is securely mounted to a floor panel placed below the driver's seat; and a pedal pad 4, one end of which is rotatably connected to the pedal bracket 3 and which is coupled to the pedal arm 2 by a ball joint coupling method.

In particular, a spring plate 5 is combined with an end of the pedal arm 2 that is placed in the pedal arm housing 1. The pedal arm 2 is installed in such a way that the pedal arm 2 can be rotated around a hinge shaft 7 relative to the pedal arm housing 1.

The accelerator pedal according to the present invention further includes a pedal effort control module 10. The pedal effort control module 10 includes: a spring 11 that is installed in such a way that a first end of the spring 11 is held by an end of the pedal arm 2 placed in the pedal arm housing 1; a spring support block 12 that is installed so as to support a second end of the spring 11; a motor 13 securely installed in the pedal arm housing 1; and a power transmission unit 14 that transmits the output power of the motor 13 to the spring support block 12, thereby moving the spring support block 12 so as to vary the length of the spring 11.

Figure 3:
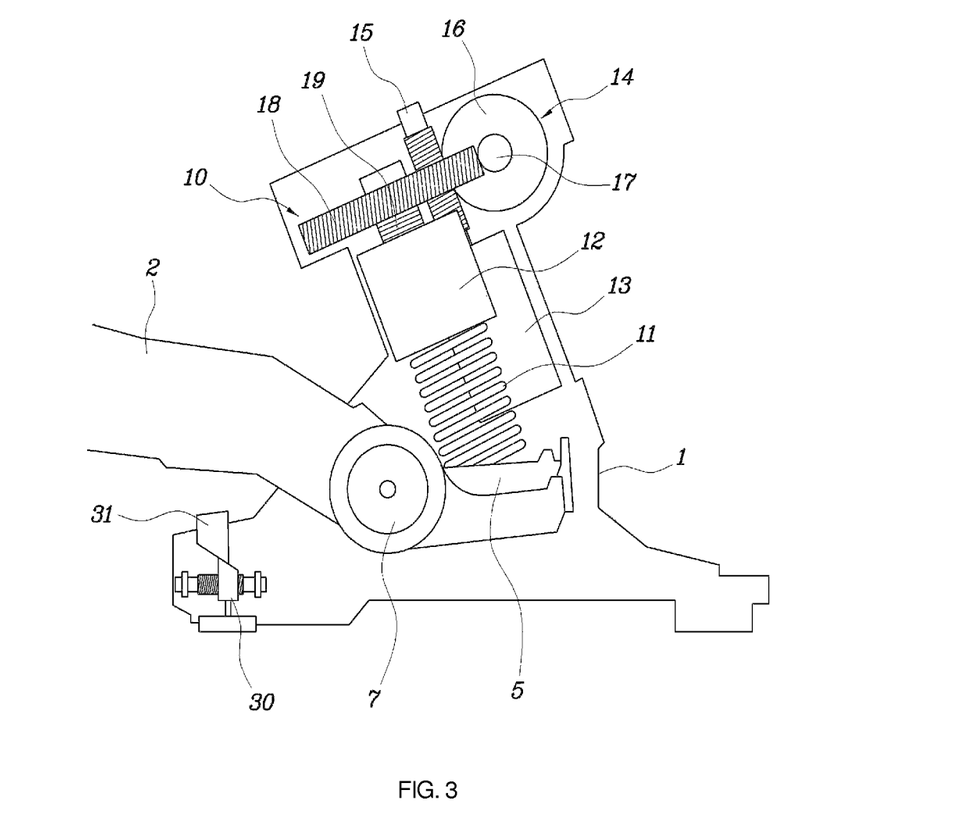
Figure 4:
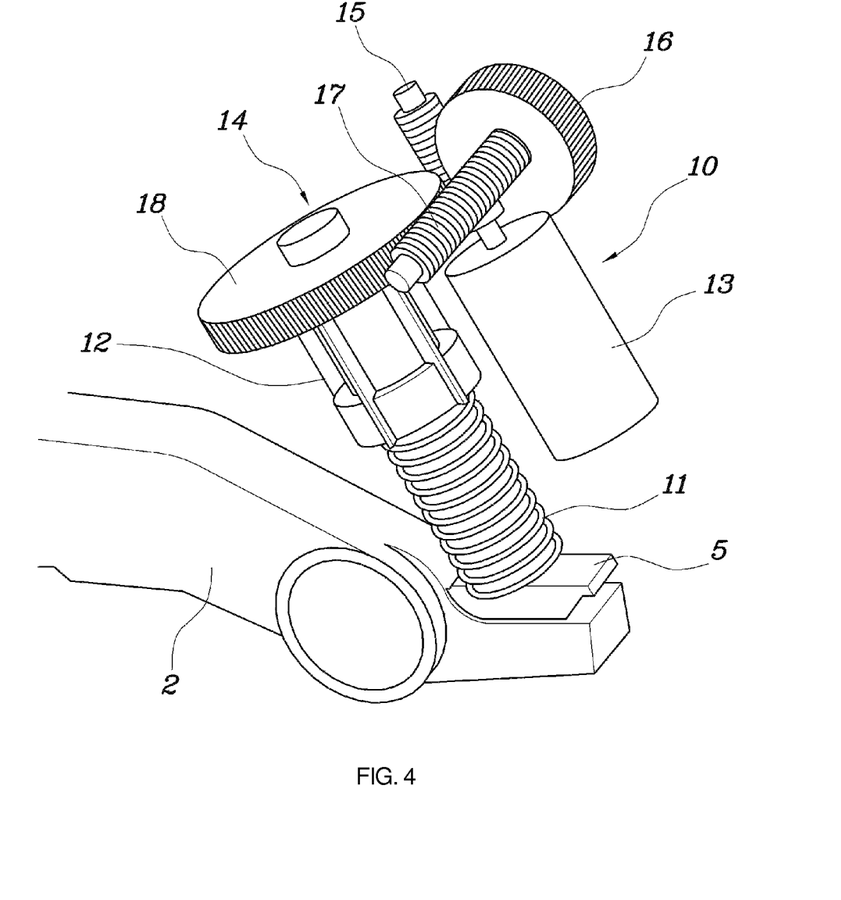
Figure 5:
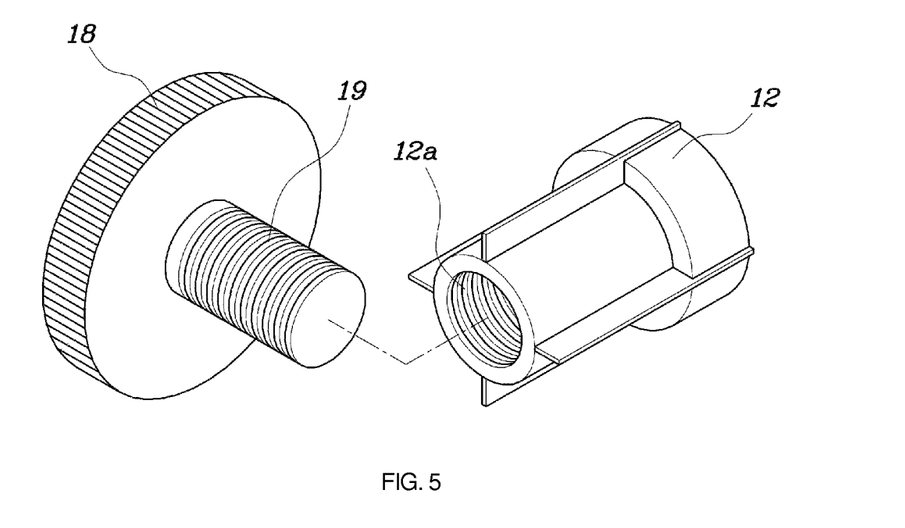

In particular, the spring 11 may be installed in such a way that the spring 11 can be directly held on the end of the pedal arm 2. Alternatively, as shown in FIGS. 3 and 4, the spring 11 may be installed in such a way that the spring plate 5 is coupled to the end of the pedal arm 2 in the pedal arm housing 1, and the lower end of the spring 11 is held on the spring plate 5.

Accordingly, when the pedal arm 2 is rotated around the central axis of the hinge shaft 7, the spring 11 is elastically compressed at a location between the spring plate 5 and the spring support block 12. The elastic compression of the spring 11 is transmitted to the pedal pad 4 through the pedal arm 2, and forms pedal effort in the pedal pad 4.

To transmit the output power of the motor 13 to the spring support block 12, the power transmission unit 14 is installed so as to connect the motor 13 to the spring support block 12.

The power transmission unit 14 includes: a first worm gear 15 that is integrated with an output shaft of the motor 13; a first worm wheel gear 16 that is rotatably engaged with the first worm gear 15; a second worm gear 17 that is integrated with the center of the first worm wheel gear 16; a second worm wheel gear 18 that is rotatably engaged with the second worm gear 17; and a gear bolt 19 that is integrally formed on the center of the second worm wheel gear 16 such that the gear bolt 19 protrudes from the center of the second worm wheel gear 16, with threads formed around the outer circumferential surface of the gear bolt 19.

Further, the spring support block 12 has a locking hole 12a, with threads formed around the inner circumferential surface of the locking hole 12a so that the locking hole 12a can be engaged with the gear bolt 19. Accordingly, when the second worm wheel gear 18 rotates, the spring support block 12 can move rectilinearly along the gear bolt 19, and the length of the spring 11 can be changed by the rectilinear movement of the spring support block 12, thereby varying the pedal effort.

The motor 13 is configured such that the operation thereof can be automatically controlled by a controller (not shown) according to vehicle running conditions, a driver's physical conditions, driving habits of the driver, a selected gear shift stage, etc.

When an accelerator pedal configured such that the pedal effort can be controlled by the pedal effort control module 10 is installed in a vehicle, and when a driver changes lanes or turns a corner while driving the vehicle, the active control method of the present invention can actively vary the accelerator pedal effort.

In particular, when the driver drives the vehicle straight at a low speed or stops the vehicle while driving the vehicle, the active control method of the present invention can actively control the accelerator pedal effort so as to maintain the pedal effort at a previous pedal effort, preferably the most recent previous pedal effort. When the driver changes lanes while driving the vehicle, the active control method can actively control the accelerator pedal effort so as to reduce the pedal effort, thereby allowing the driver to change lanes quickly. Further, when the driver turns a corner while driving the vehicle, the active control method can actively control the accelerator pedal effort so as to increase the pedal effort, thereby providing improved driving safety to the driver when turning corners.

Figure 6:
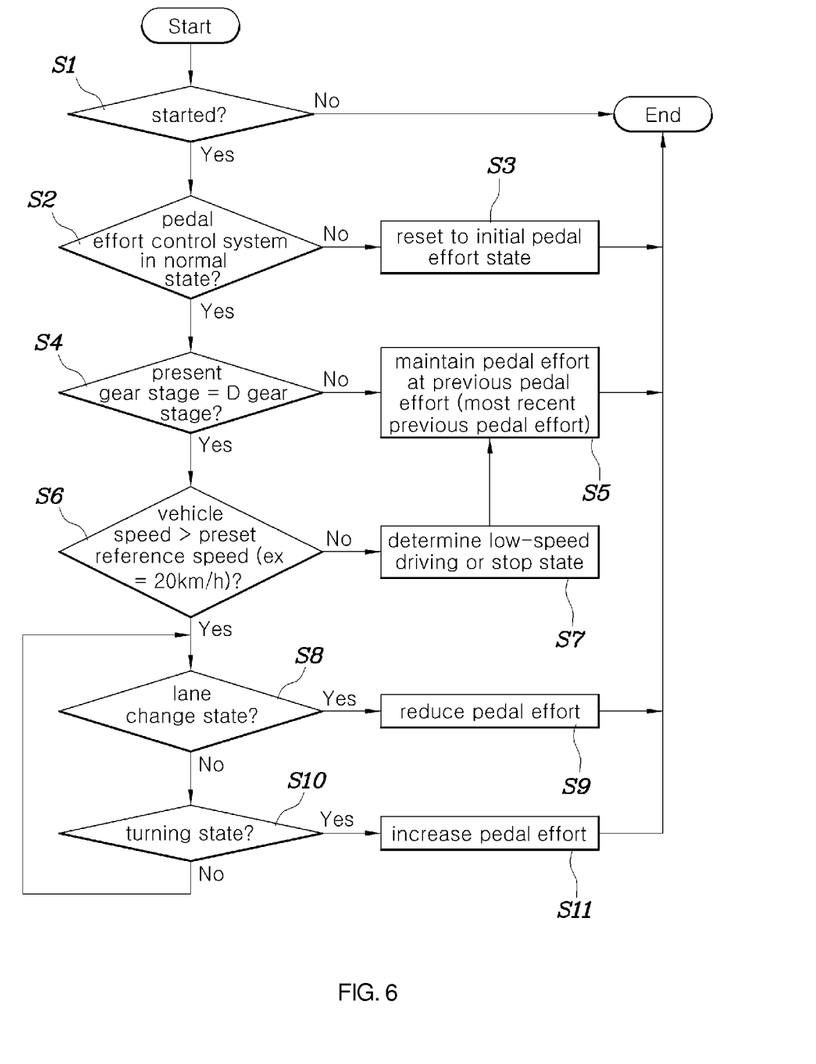
FIG. 6 is a flowchart illustrating a method of actively controlling the pedal effort of the accelerator pedal having the pedal effort control function according to the present invention.
Figure 7:
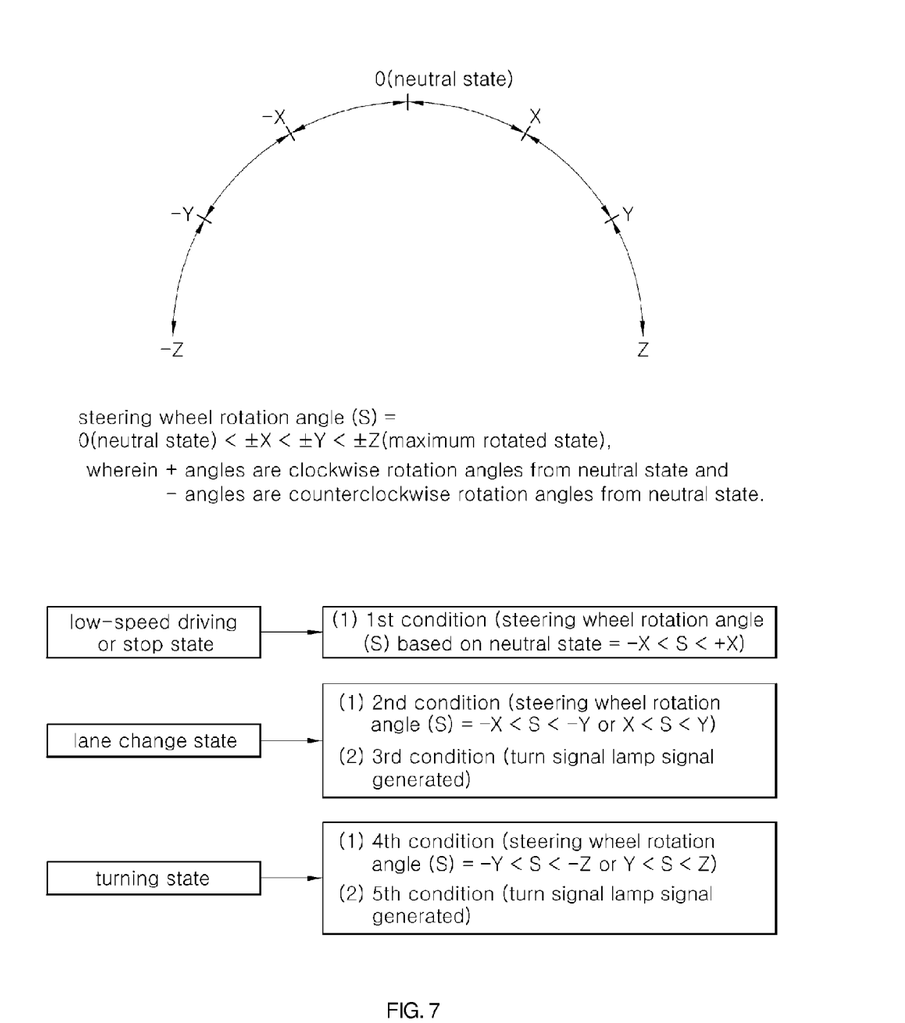
FIG. 7 is a view illustrating respective conditions when a driver drives a vehicle straight at a low speed, stops the vehicle, changes lanes, and turns a corner while driving the vehicle.

To realize the above-mentioned function, as shown in FIGS. 6 and 7, the active control method of accelerator pedal effort according to the present invention comprises: a pedal effort control system checking step of determining whether a pedal effort control system is in a normal state when a vehicle having the pedal effort controllable accelerator pedal is started; a gear stage determination step of determining whether a present gear stage is a drive (D) gear stage when it is determined at the pedal effort control system checking step that the pedal effort control system is in the normal state; a vehicle speed determination step of determining whether a vehicle speed is higher than a preset reference speed, which corresponds to a reference speed of low-speed driving, when it is determined at the gear stage determination step that the present gear stage is the drive (D) gear stage; a pedal effort reducing step of determining whether the driver changes lanes when it is determined at the vehicle speed determination step that the vehicle speed is higher than the preset reference speed, and controlling a present accelerator pedal effort so as to reduce the present pedal effort to a preset target pedal effort when it is determined that the driver changes lanes; and a pedal effort increasing step of determining whether the driver turns a corner when it is determined that the driver does not change lanes, and controlling the present accelerator pedal effort so as to increase the present pedal effort to the preset target pedal effort when it is determined that the driver turns a corner.

In particular, only when it is determined at the pedal effort control system checking step that the pedal effort control system is in the normal state, the gear stage determination step is performed. Also, only when a battery voltage signal represents a normal state of a battery, no signal that requires an initialization of the present accelerator pedal effort against an abnormal state is output, and a signal that represents a pedal effort active control mode is generated, it is determined that the pedal effort control system is in the normal state.

Further, when it is determined at the pedal effort control system checking step that the pedal effort control system is in an abnormal state, the present accelerator pedal effort is reset to an initial pedal effort. In particular, the initial pedal effort state means a reset state of the pedal effort.

Further, only when it is determined at the gear stage determination step that the present gear stage is the drive (D) gear stage, the vehicle speed determination step is performed. However, when it is determined at the present gear stage that the present gear stage is not the drive (D) gear stage, the present accelerator pedal effort is controlled to be maintained at a previous pedal effort, preferably the most recent previous pedal effort. In particular, the preset reference speed that is the reference speed of low-speed driving and is used at the vehicle speed determination step may be set to about 20 Km/h without being limited to that speed.

When it is determined at the vehicle speed determination step that the vehicle speed is not higher than the preset reference speed, it is determined that the driver is driving the vehicle straight at a low speed or is stopping the vehicle. When the driver drives the vehicle straight at a low speed or stops the vehicle as described above, the present accelerator pedal effort is controlled to be maintained at a previous pedal effort, preferably the most recent previous pedal effort.

In particular, as the basis for determining that the driver is driving the vehicle straight at a low speed or is stopping the vehicle, it is necessary to satisfy a first condition that a steering wheel rotation angle S is larger than an angle −X and is less than an angle X based on a neutral state, that is, $-X<S<X$.

Further, as the basis for determining at the pedal effort reducing step that the driver is changing lanes while driving the vehicle, it is necessary to satisfy both a second condition that the steering wheel rotation angle S is $-X<S<-Y$ or $X<S<Y$ and a third condition that a turn signal lamp signal has been generated, or it is necessary to satisfy at least the second condition.

Further, as the basis for determining at the pedal effort increasing step that the driver is turning a corner while driving the vehicle, it is necessary to satisfy both a fourth condition that the steering wheel rotation angle S is $-Y<S<-Z$ or $Y<S<Z$ and a fifth condition that a turn signal lamp signal has been generated, or it is necessary to satisfy at least the fourth condition.

In particular, the difference in the size of the steering wheel rotation angle S is defined by a relation, $0(\text{neutral state}) < \pm X < \pm Y < \pm Z(\text{maximum rotated state})$, wherein the +angles are clockwise rotation angles from the neutral state and the −angles are counterclockwise rotation angles from the neutral state.

Hereinbelow, the operation of the embodiment of the present invention will be described. First, the operation of controlling the pedal effort will be described.

When the motor 13 is operated under the control of the controller and the output power of the motor 13 is transmitted to the spring support block 12 through the worm gears 15 and 17, the worm wheel gears 16 and 18, and the gear bolt 19, the spring support block 12 moves upward or downward along the gear bolt 19 from a position shown in FIG. 3.

When the spring support block 12 moves upward along the gear bolt 19 (in a direction far from the spring plate), the spring 11 is elastically tensioned by the restoring force such that the length of the spring 11 is increased. In the above state, the spring force that acts on the pedal arm 2 is reduced, and so the accelerator pedal effort is reduced.

On the contrary, when the spring support block 12 moves downward along the gear bolt 19 (in a direction close to the spring plate), the spring 11 is elastically compressed such that the length of the spring 11 is reduced. In the above state, the spring force that acts on the pedal arm 2 is increased, and so the accelerator pedal effort is increased.

In particular, the motor 13 is configured such that it can be automatically operated under the control of the controller (not shown). For example, when a driver drives a vehicle straight at a low speed or stops the vehicle, the active control method of the present invention actively controls the accelerator pedal effort so as to maintain the pedal effort at a previous pedal effort, preferably the most recent previous pedal effort. When the driver changes lanes while driving the vehicle, the active control method actively controls the accelerator pedal effort so as to reduce the pedal effort. Further, when the driver turns a corner while driving the vehicle, the active control method actively controls the accelerator pedal effort so as to increase the pedal effort.

Further, when the driver drives the vehicle at a low speed, for example, on a congested street in the city, the pedal effort can be controlled to be reduced, thereby reducing the fatigue of the driver which may be caused by the repeated pedal manipulation. However, when the driver drives the vehicle at a high speed, for example, on an express highway, the pedal effort can be controlled to be increased, thereby supporting the pedal under a constant pressure and reducing the fatigue in a driver's ankle.

Further, when driving uphill, the pedal effort is controlled to be reduced so as to increase a pedal manipulation amount. When driving downhill, the pedal effort is controlled to be increased so as to reduce the pedal manipulation amount.

Further, when the vehicle runs at a high speed or is driven in a safety mode, the pedal effort can be controlled to be increased so as to allow a driver to drive the vehicle in safety. Further, the pedal effort can be appropriately controlled in consideration of age, sex and physical conditions of the driver.

Hereinbelow, the method of actively varying the accelerator pedal effort according to a state in which the driver changes lanes or turns a corner while driving a vehicle having the pedal effort controllable accelerator pedal will be described in detail with reference to FIGS. 6 and 7.

When the vehicle is started (step S1), the controller determines whether the pedal effort control system is in a normal state or not (step S2). In particular, only when a battery voltage signal represents a normal state of a battery, no signal that requires an initialization of the present accelerator pedal effort against an abnormal state is output, and a signal that represents a pedal effort active control mode is generated, the controller determines at step S2 that the pedal effort control system is in the normal state.

In particular, only when the battery voltage signal is 9V to 16.5V, the controller determines at step S2 that the pedal effort control system is in the normal state.

When the controller determines that the pedal effort control system is in an abnormal state, the present accelerator pedal effort is reset to an initial pedal effort state (step S3). After step S3, the pedal effort control process proceeds to End.

When it is determined that the pedal effort control system is in the normal state, whether or not the present gear stage is the drive (D) gear stage is determined (step S4). In the above state, when it is determined that the present gear stage is not the drive (D) gear stage, the present accelerator pedal effort is actively controlled to be maintained at the previous pedal effort (the most recent previous pedal effort), and the pedal effort control process proceeds to End (step S5).

However, when it is determined that the present gear stage is the drive (D) gear stage, whether or not the vehicle speed is higher than the preset reference speed (the reference speed of low-speed driving) is determined (step S6). When it is determined at the vehicle speed determination step that the vehicle speed is not higher than the preset reference speed, the controller determines that the driver is driving the vehicle straight at a low speed or is stopping the vehicle (step S7), and the process moves to step S5.

In particular, to determine whether the driver is driving the vehicle straight at a low speed or is stopping the vehicle, it is necessary to satisfy the first condition that the steering wheel rotation angle S is $-X<S<X$ based on the neutral state. When the first condition is satisfied, the accelerator pedal effort of the vehicle is controlled to be maintained at a previous pedal effort (the most recent previous pedal effort).

When the accelerator pedal effort of the vehicle is maintained at the previous pedal effort, preferably the most recent previous pedal effort as described above, while the driver is driving the vehicle straight at a low speed or is stopping the vehicle, the driver can continue easy, efficient manipulation of the accelerator pedal, and so the present invention can allow the driver to manipulate the accelerator pedal easily, safely and efficiently.

Further, when it is determined at the vehicle speed determination step that the vehicle speed is higher than the preset reference speed, whether or not the driver is changing lanes is determined (step S8). In particular, to determine that the driver changes lanes, it is necessary to satisfy both the second condition that the steering wheel rotation angle S is $-X<S<-Y$ or $X<S<Y$ and the third condition that a turn signal lamp signal has been generated, or it is necessary to satisfy at least the second condition. When the second and the third conditions are satisfied at the same time or only the second condition is satisfied, the accelerator pedal effort of the vehicle is controlled to be reduced to the preset target pedal effort (step S9).

When the accelerator pedal effort of the vehicle is controlled to be reduced to the preset target pedal effort as described above while the driver changes lanes, the driver can manipulate the accelerator pedal quickly, thereby changing lanes quickly. Accordingly, the present invention is advantageous in that it can allow the driver to change lanes safely and efficiently.

Further, when it is determined that the driver is not changing lanes, whether or not the driver is turning a corner is determined (step S10). In particular, to determine that the driver is turning a corner, it is necessary to satisfy both the fourth condition that the steering wheel rotation angle S is $-Y<S<-Z$ or $Y<S<Z$ and the fifth condition that a turn signal lamp signal has been generated, or it is necessary to satisfy at least the fourth condition. When the fourth and the fifth conditions are satisfied at the same time or only the fourth condition is satisfied, the accelerator pedal effort of the vehicle is controlled to be increased to the preset target pedal effort (step S11).

When the accelerator pedal effort of the vehicle is controlled to be increased to the preset target pedal effort as described above while the driver turns a corner, it is possible to prevent quick manipulation of the accelerator pedal, and so the present invention is advantageous in that it can allow the driver to turn corners safely and efficiently.

When it is determined at step S10 that the driver is not turning a corner, the process returns to step S8 and repeats.

As described above, the active control method of acceleration pedal effort according to the present invention is advantageous in that the length of the spring 11 can be controlled by moving the spring support block 12 in response to an operation of the motor 13 without changing parts of an accelerator pedal with new parts, and so the present invention can easily vary the pedal effort as desired, and can efficiently meet the safety law and regulations of the accelerator pedal effort regardless of models of vehicles.

Further, when the driver changes lanes or turns corners while driving the vehicle, the present invention can actively vary the accelerator pedal effort, and so the present invention can provide improved driving safety to the driver.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An active control method of accelerator pedal effort, comprising:
    a vehicle speed determination step of determining whether or not a vehicle speed is higher than a preset reference speed, which corresponds to a reference speed of low-speed driving, when a vehicle having a pedal effort controllable accelerator is started;
    a pedal effort reducing step of determining whether or not a driver of the vehicle is changing lanes when it is determined at the vehicle speed determination step that the vehicle speed is higher than the preset reference speed, and controlling a present accelerator pedal effort so as to reduce the pedal effort to a preset target pedal effort when it is determined that the driver is changing lanes, wherein acceleration of the vehicle is easier during overtaking after changing lanes; and
    a pedal effort increasing step of determining whether or not the driver is turning a corner when it is determined that the driver is not changing lanes, and controlling the present accelerator pedal effort so as to increase the pedal effort to another preset target pedal effort when it is determined that the driver is turning a corner to allow the vehicle to turn the corner in a stable state by preventing unnecessary acceleration,
    wherein the present accelerator pedal effort is higher than the preset target pedal effort of the pedal effort reducing step, and lower than the another preset target pedal effort of the pedal effort increasing step.

2. The active control method of accelerator pedal effort as set forth in claim 1, wherein when it is determined at the vehicle speed determination step that the vehicle speed is not higher than the preset reference speed, it is determined that the driver is driving the vehicle straight at a low speed or is stopping the vehicle, and when the driver is driving the vehicle straight at the low speed or is stopping the vehicle, the present accelerator pedal effort is controlled to be maintained at a previous pedal effort that corresponds to a most recent previous pedal effort.

3. The active control method of accelerator pedal effort as set forth in claim 2, wherein when a first condition that a steering wheel rotation angle (S) is larger than an angle −X and is less than an angle X based on a neutral state, that is, −X<S<X, is satisfied, it is determined that the driver is driving the vehicle straight at the low speed or is stopping the vehicle,
    wherein a difference in a size of the steering wheel rotation angle (S) is defined by a relation, 0(neutral state) <±X<±Y<±Z(maximum rotated state), wherein +angles are clockwise rotation angles from the neutral state and −angles are counterclockwise rotation angles from the neutral state.

4. The active control method of accelerator pedal effort as set forth in claim 1, wherein when both a second condition that a steering wheel rotation angle (S) is −X<S<−Y or X<S<Y and a third condition that a turn signal lamp signal has been generated are satisfied, or when only the second condition is satisfied, it is determined that the driver is changing lanes while driving the vehicle,
    wherein a difference in a size of the steering wheel rotation angle (S) is defined by a relation, 0(neutral state) <±X<±Y<±Z(maximum rotated state), wherein +angles are clockwise rotation angles from the neutral state and −angles are counterclockwise rotation angles from the neutral state.

5. The active control method of accelerator pedal effort as set forth in claim 1, wherein when both a fourth condition that a steering wheel rotation angle (S) is −Y<S<−Z or Y<S<Z and a fifth condition that a turn signal lamp signal has been generated are satisfied, or when only the fourth condition is satisfied, it is determined that the driver is turning a corner while driving the vehicle,
    wherein a difference in a size of the steering wheel rotation angle (S) is defined by a relation, 0(neutral state) <±X<±Y<±Z(maximum rotated state), wherein +angles are clockwise rotation angles from the neutral state and −angles are counterclockwise rotation angles from the neutral state.

6. The active control method of accelerator pedal effort as set forth in claim 1, further comprising:
    a gear stage determination step of determining whether or not a present gear stage is a drive (D) gear stage when the vehicle is started, prior to the vehicle speed determination step.

7. The active control method of accelerator pedal effort as set forth in claim 6, wherein only when it is determined at the gear stage determination step that the present gear stage is the drive (D) gear stage, the vehicle speed determination step is performed, and when it is determined that the present gear stage is not the drive (D) gear stage, the present accelerator pedal effort is controlled to be maintained at a previous pedal effort (most recent previous pedal effort).

8. The active control method of accelerator pedal effort as set forth in claim 6, further comprising:
    a pedal effort control system checking step of determining whether a pedal effort control system is in a normal state when the vehicle is started, prior to the gear stage determination step.

9. The active control method of accelerator pedal effort as set forth in claim 8, wherein only when it is determined at the pedal effort control system checking step that the pedal effort control system is in the normal state, the gear stage determination step is performed, and when it is determined that the pedal effort control system is in an abnormal state, the present accelerator pedal effort is reset to an initial pedal effort.

10. The active control method of accelerator pedal effort as set forth in claim 8, wherein only when a battery voltage signal represents a normal state of a battery, no signal that requires an initialization of the present accelerator pedal effort against an abnormal state is output, and a signal that represents a pedal effort active control mode is generated, it is determined at the pedal effort control system checking step that the pedal effort control system is in the normal state.

* * * * *